(12) United States Patent
Kanto (10) Patent No.: US 12,548,182 B2
(45) Date of Patent: Feb. 10, 2026

(54) INFORMATION PROCESSING DEVICE AND INFORMATION PROCESSING SYSTEM

(71) Applicant: DMG MORI CO., LTD., Nara (JP)

(72) Inventor: Kenta Kanto, Nara (JP)

(73) Assignee: DMG MORI CO., LTD., Nara (JP)

(*) Notice: Subject to any disclaimer, the term of this patent is extended or adjusted under 35 U.S.C. 154(b) by 698 days.

(21) Appl. No.: 17/797,759

(22) PCT Filed: Nov. 4, 2020

(86) PCT No.: PCT/JP2020/041227
§ 371 (c)(1),
(2) Date: Aug. 5, 2022

(87) PCT Pub. No.: WO2021/161592
PCT Pub. Date: Aug. 19, 2021

(65) Prior Publication Data
US 2023/0076772 A1 Mar. 9, 2023

(30) Foreign Application Priority Data

Feb. 12, 2020 (JP) .................................. 2020-021365

(51) Int. Cl.
*G06T 7/70* (2017.01)
*B23Q 17/24* (2006.01)
(Continued)

(52) U.S. Cl.
CPC ............ *G06T 7/70* (2017.01); *B23Q 17/2409* (2013.01); *G06T 7/0004* (2013.01); *G06T 17/20* (2013.01);
(Continued)

(58) Field of Classification Search
CPC ......... G06T 7/0004; G06T 7/70; G06T 17/20; G06T 2207/20021; G06T 2207/20081;
(Continued)

(56) References Cited

U.S. PATENT DOCUMENTS 10,195,649 B2 2/2019 Takikawa
10,307,876 B2 6/2019 Okuda
(Continued)

FOREIGN PATENT DOCUMENTS

CN 106845424 A 6/2017
CN 108526968 A 9/2018
(Continued)

OTHER PUBLICATIONS

International Search Report, PCT/JP2020/041227, dated Dec. 1, 2020, 2 pages.
(Continued)

*Primary Examiner* — Ping Y Hsieh
*Assistant Examiner* — Jose M Torres
(74) *Attorney, Agent, or Firm* — Stinson LLP (57) ABSTRACT

Disclosed is an information processing device (10) configured to identify a position of a detection target from image data imaged by an imaging unit configured to image an interior of a machine tool including the imaging unit, the information processing device including: an image generation unit (102) configured to generate a mesh image obtained by partitioning at least a portion of the image data into a plurality of mesh regions; and an identification unit (103) configured to identify the position of the detection target for a first mesh region of the mesh image, wherein the identification unit is configured to identify the position using the first mesh region, and a second mesh region shifted from the first mesh region by a predetermined amount and partially overlapping with the first mesh region.

8 Claims, 7 Drawing Sheets

(51) Int. Cl.
*G06T 7/00* (2017.01)
*G06T 17/20* (2006.01)
(52) U.S. Cl.
CPC ............... *G06T 2207/20021* (2013.01); *G06T 2207/20081* (2013.01); *G06T 2207/30164* (2013.01); *Y02P 70/10* (2015.11)
(58) Field of Classification Search
CPC ....... G06T 2207/30164; B23Q 17/2409; Y02P 70/10
See application file for complete search history.

(56) References Cited

U.S. PATENT DOCUMENTS

| | | | |
|---|---|---|---|
| 10,346,969 B1* | 7/2019 | Raghu | G06N 3/08 |
| 11,858,011 B2* | 1/2024 | Miyawaki | B05B 13/0431 |
| 12,138,777 B2* | 11/2024 | Miyawaki | B25J 19/023 |
| 2007/0064101 A1 | 3/2007 | Hasegawa et al. | |
| 2009/0082979 A1* | 3/2009 | Sato | G01R 31/2831 702/59 |
| 2011/0319711 A1 | 12/2011 | Yamaguchi et al. | |
| 2016/0184947 A1 | 6/2016 | Itou | |
| 2017/0043442 A1* | 2/2017 | Takikawa | B05B 15/60 |
| 2017/0144262 A1 | 5/2017 | Okuda | |
| 2017/0165803 A1 | 6/2017 | Nakayama | |
| 2018/0250783 A1* | 9/2018 | Inaba | B23Q 3/15526 |
| 2018/0267489 A1* | 9/2018 | Tango | G05B 19/406 |
| 2019/0012579 A1* | 1/2019 | Namiki | G06V 10/764 |
| 2019/0039198 A1 | 2/2019 | Sugiura | |
| 2019/0191150 A1 | 6/2019 | Zhang et al. | |
| 2019/0196454 A1 | 6/2019 | Tarui | |
| 2020/0258254 A1* | 8/2020 | Packwood | G06T 7/11 |
| 2021/0004946 A1* | 1/2021 | Yoon | G06T 7/001 |
| 2021/0138660 A1* | 5/2021 | Miyawaki | B23Q 17/20 |
| 2022/0254137 A1* | 8/2022 | Tu | G06V 10/765 |
| 2023/0043666 A1* | 2/2023 | Inoue | B23Q 17/249 |
| 2023/0049354 A1* | 2/2023 | Okuno | B23Q 17/2433 |

FOREIGN PATENT DOCUMENTS

| | | |
|---|---|---|
| CN | 109564173 A | 4/2019 |
| JP | H03-184747 A | 8/1991 |
| JP | H08-197383 A | 8/1996 |
| JP | 2007-114742 A | 5/2007 |
| JP | 2010-035756 A | 2/2010 |
| JP | 2012-010733 A | 1/2012 |
| JP | 2018-024094 A | 2/2018 |
| JP | 2019-111637 A | 7/2019 |

OTHER PUBLICATIONS

Written Opinion, PCT/JP2020/041227, dated Dec. 1, 2020, 3 pages.
European Patent Office, Supplementary European Search Report, Application No. EP 20919055, dated Jan. 26, 2024, 9 pages.

* cited by examiner

INFORMATION PROCESSING DEVICE AND INFORMATION PROCESSING SYSTEM

REFERENCE TO RELATED APPLICATIONS

This application is the 371 U.S. national stage application of International Patent Application No. PCT/JP2020/041227, filed Nov. 4, 2020, which claims the benefit of Japanese Patent Application No. 2020-021365, filed Feb. 12, 2020, the entire disclosures of which are incorporated herein by reference

TECHNICAL FIELD

The present disclosure relates to an information processing device and an information processing system.

BACKGROUND ART

Chips are produced when a workpiece to be machined is machined by a machine tool. Accumulation of a large amount of chips makes it difficult to continue machining. For this reason, chips produced during machining need to be removed from the machine tool. PTL 1 discloses a technique for detecting the state of accumulation of swarf in the interior of a machine tool, and cleaning a place for which it is determined that the removal of swarf is required.

CITATION LIST

Patent Literature

[PTL 1] Japanese Laid-Open Patent Publication No. 2016-120589

SUMMARY OF INVENTION

Technical Problem

However, it may be difficult to accurately identify the accumulation position of chips. In addition to the position of chips, the position of a flaw in a workpiece may be identified inside a machine tool, and this may also be difficult in some cases.

Therefore, an object of the present disclosure is to increase the detection accuracy of the accumulation position of chips and the position of a flaw or the like in a workpiece.

Solution to Problem

An information processing device according to the present disclosure is an information processing device (10) configured to identify a position of a detection target from image data imaged by an imaging unit configured to image an interior of a machine tool including the imaging unit, the information processing device including: an image generation unit (102) configured to generate a mesh image obtained by partitioning at least a portion of the image data into a plurality of mesh regions; and an identification unit (103) configured to identify the position of the detection target for a first mesh region of the mesh image, wherein the identification unit is configured to identify the position using the first mesh region, and a second mesh region shifted from the first mesh region by a predetermined amount and partially overlapping with the first mesh region.

The present disclosure can also provide an information processing system. An information processing system or an information processing method according to the present disclosure includes: an imaging step of imaging an interior of a machine tool; an image generation step of generating a mesh image obtained by partitioning at least a portion of imaged image data into a plurality of mesh regions; and an identification step of identifying a position of a detection target for a first mesh region of the mesh image. The identification step includes identifying the position of the detection target from the image data using the first mesh region, and a second mesh region shifted from the first mesh region by a predetermined amount and partially overlapping with the first mesh region.

The present disclosure can also provide a machine tool. A machine tool according to the present disclosure is a machine tool that machines a workpiece, the machine tool including: an imaging unit; an image generation unit configured to generate a mesh image obtained by partitioning at least a portion of image data imaged by the imaging unit into a plurality of mesh regions; an identification unit configured to, even if, from a plurality of first mesh regions constituting the mesh regions of the mesh image, the presence of a detection target has not been identified in the first mesh regions using the plurality of first mesh regions, and a plurality of second mesh regions shifted from the corresponding ones of the plurality of first mesh regions by a predetermined amount and partially overlapping with the corresponding ones of the plurality of first mesh regions, if the presence of the detection target has been identified in the second mesh regions with which the first mesh regions partially overlap, identify that the detection target is present in the first mesh regions; and a liquid discharger configured to discharge liquid to the first mesh regions in which the presence of the detection target has been identified.

These general and specific aspects may be realized by systems, methods, and computer programs, and combinations thereof.

Advantageous Effects of Invention

According to the present disclosure, it is possible to increase the detection accuracy of the accumulation position of chips and the position of a flaw or the like in a workpiece.

DESCRIPTION OF EMBODIMENTS

More specifically, the information processing device according to the present disclosure is an information processing device configured to identify the presence of a detection target from image data imaged by an imaging unit configured to image an interior of a machine tool including the imaging unit, the information processing device including: an image generation unit configured to generate a mesh image obtained by partitioning at least a portion of the image data into a plurality of first mesh regions; and an identification unit configured to identify the presence of the detection target from the first mesh regions of the mesh image, wherein the identification unit is configured to: even if the presence of the detection target has not been identified from the first mesh regions, if the presence of the detection target has been identified from at least any one of a plurality of second mesh regions that each have the same size as the first mesh regions, that are shifted from the plurality of first mesh regions by a predetermined amount, and that are provided so as to at least partially overlap with the first mesh regions, identify that the detection target is present in the second mesh region in which the presence of the detection target has been identified; or identify that the detection target is present in at least any one of a plurality of first mesh regions that overlap with the second mesh region in which the presence of the detection target has been identified. At this time, the identification unit may identify that the detection target is present in a first mesh region group that is a collection of a plurality of first mesh regions overlapping with the second mesh region in which the presence of the detection target has been identified.

More specifically, the information processing system or the information processing method according to the present disclosure includes: an imaging step of imaging an interior of a machine tool; an image generation step of generating a mesh image obtained by partitioning at least a portion of the imaged image data into a plurality of first mesh regions; and an identification step of identifying the presence of the detection target from the first mesh regions of the mesh image, wherein the identification step includes: even if the presence of the detection target has not been identified from the first mesh regions, if the presence of the detection target has been identified from at least any one of a plurality of second mesh regions that each have the same size as the first mesh regions, that are shifted from the plurality of first mesh regions by a predetermined amount, and that are provided so as to at least partially overlap with the first mesh regions, identifying that the detection target is present in the second mesh region in which the presence of the detection target has been identified; or identifying that the detection target is present in at least any one of a plurality of first mesh regions that overlap with the second mesh region in which the presence of the detection target has been identified. At this time, the identification step may include identifying that the detection target is present in a first mesh region group that is a collection of a plurality of first mesh regions overlapping with the second mesh region in which the presence of the detection target has been identified.

More specifically, the machine tool according to the present disclosure is a machine tool that machines a workpiece, the machine tool including: an imaging unit; an image generation unit configured to generate a mesh image obtained by partitioning at least a portion of image data of an interior of the machine tool imaged by the imaging unit into a plurality of first mesh regions; an identification unit configured to: identify the presence of a detection target from the first mesh regions of the mesh image; and, even if the presence of the detection target has not been identified from the first mesh regions, if the presence of the detection target has been identified from at least any one of a plurality of second mesh regions that each have the same size as the first mesh regions, that are shifted from the plurality of first mesh regions by a predetermined amount, and that are provided so as to partially overlap with the first mesh regions, identify that the detection target is present in the second mesh region in which the presence of the detection target has been identified; or identify that the detection target is present in at least any one of a plurality of first mesh regions that overlap with the second mesh region in which the presence of the detection target has been identified; and a liquid discharger configured to discharge liquid to a position corresponding to the first mesh region or the second mesh region in which the presence of the detection target has been identified.

In addition to or instead of identifying the presence of the detection target, the identification unit may detect the amount of the detection target present. Similarly, in addition to or instead of identifying the presence of the detection target, the identification step may include detecting the amount of the detection target present. At this time, if there are a plurality of first mesh regions or second mesh regions in which the detection target is present, the order of priority of positions to which liquid is to be discharged from the liquid discharger may be determined based on the amount of the detection target present. The larger the amount present, the higher the order of priority may be, and liquid may be discharged in descending order of priority. If the amount of the detection target present in the first mesh region or the second mesh region is smaller than a predetermined threshold, it may be determined that no detection target is present in the mesh region.

The amount of the detection target present may be detected as any numerical value. Specifically, the amount present may be detected as a physical quantity such as a mass or a weight (e.g., 96 g), may be detected as a presence probability (e.g., 0.96) in the mesh region, may be detected as an image occupancy ratio (e.g., a ratio such as 96%), or may be detected as a different quantity. Note that the word "detection" is used as a concept that also includes determination, identification, other processes, and so forth depending on the situation.

Hereinafter, an information processing device, a machine tool, and an information processing system according to embodiments will be described with reference to the drawings. In the following, the same components are denoted by the same reference numerals, and the descriptions thereof have been omitted.

The "machine tool" described below machines a workpiece to be machined such as metal into a desired shape through cutting, grinding, and the like. The "information processing device" and the "information processing system" identify the position of a detection target from imaged data obtained by imaging the interior of a machine tool. Here, the "detection target" of the information processing device is chips that have been produced from a workpiece to be machined by the machine tool as a result of machining and accumulated inside the machine tool, or a flaw formed in a workpiece as a result of machining.

In the following description, the term "mesh region" means a partial region of an image obtained by partitioning image data. By partitioning a single image, the single image can be divided into a plurality of mesh regions.

Embodiments

<Machine Tool>

Figure 1:
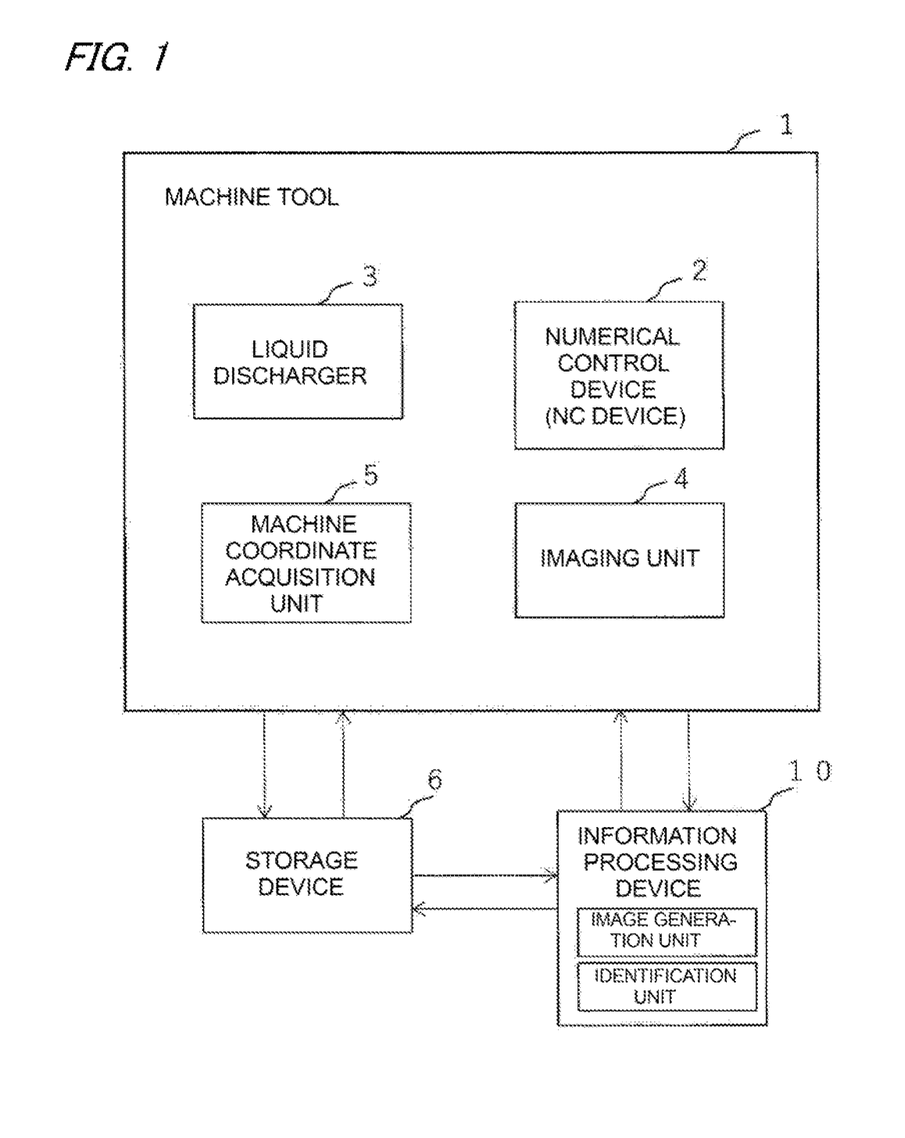
FIG. 1 is a block diagram showing a configuration of a machine tool.

An example of a machine tool 1 according to an embodiment will be described with reference to FIG. 1. The machine tool 1 machines a target workpiece. By machining the workpiece, chips produced as a result of a portion of the workpiece having been separated are accumulated inside the machine tool 1. For example, the machine tool 1 includes a numerical control device 2 that controls the driving of a spindle for machining, a liquid discharger 3 that discharges liquid for moving chips produced as a result of machining, an imaging unit 4 that images the interior of the machine tool 1, and a machine coordinate acquisition unit 5. For example, the machine tool 1 is connected to an information processing device 10 that identifies the position of a detection target from image data imaged by the imaging unit 4, and a storage device 6 that stores control signals and calculation results from the machine tool 1 and the information processing device 10.

The numerical control device 2 transmits a control signal for a motor or the like of the machine tool 1 to the various units. As will be described later, the control signal is generated based on processing performed by the information processing device 10, and is transmitted.

Under the control of the numerical control device 2, the liquid discharger 3 discharges liquid for moving the chips accumulated inside the machine tool 1. As will be described later, a control signal generated by a nozzle control unit 104 of the information processing device 10 is input to the liquid discharger 3 via the numerical control device 2. The machine tool 1 can collect and discharge the chips that have been moved in this manner to the outside of a machining region thereof. For example, the liquid discharger 3 includes a nozzle capable of discharging liquid, an actuator that drives the nozzle, and a pump that pumps up liquid from a liquid reservoir in which the liquid is stored, and the liquid discharger 3 discharges the liquid from the nozzle to the chips. As the liquid, a coolant for cooling and lubricating the workpiece and machining means that generate heat during machining, or a different liquid may be used. In the following, an example in which a coolant is used as the liquid for moving the chips will be described. In order to enable cleaning of a wide area of the interior of the machine tool 1, the liquid discharger 3 is configured to adjust the position and the orientation of the nozzle, and the discharging pressure of the liquid, for example. The machine tool 1 may include a plurality of liquid dischargers 3.

The imaging unit 4 is, for example, a camera including an imaging element such as a CCD or a CMOS. The imaging unit 4 can image the interior of the machine tool 1 at a predetermined timing. The imaging range of the imaging unit 4 covers a target area that is located in the interior of the machine tool 1 and in which chips produced from the workpiece are detected. In addition, the imaging unit 4 outputs the obtained image data to the information processing device 10. For example, the imaging unit 4 performs imaging at regular timings during machining of the workpiece. In addition, the imaging unit 4 may perform imaging at a timing before a new workpiece is placed after the machined workpiece has been removed from the machine tool 1. In order to enable grasping of the state over a wide area, the machine tool 1 may include a plurality of imaging units 4.

Figure 2:
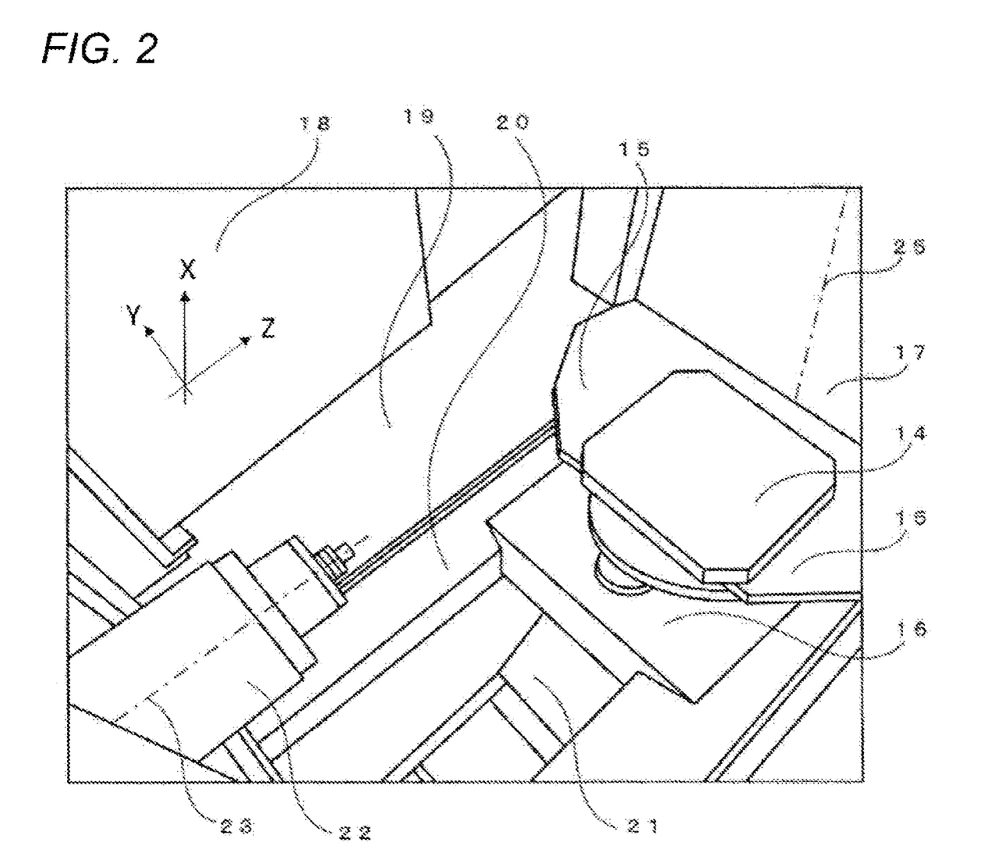
FIG. 2 shows an imaged image of the interior of a machine tool.

For movable components of the structure of the machine tool 1, such as a pallet 14, a table 16, a spindle 22, and so forth, which will be described later with reference to FIG. 2, the machine coordinate acquisition unit 5 acquires machine coordinates representing a position inside the machine tool 1. The machine coordinate acquisition unit 5 transmits the acquired machine coordinates to the information processing device 10. For example, position information included in a control signal generated for control by the numerical control device 2 for machining may be used as the machine coordinates, or the machine coordinates may be acquired using a sensor of some kind.

Although not shown in FIG. 1, the machine tool 1 additionally includes various components, which will be described with reference to FIG. 2. FIG. 2 is an imaged image obtained by imaging the interior of the machine tool 1, and shows a pallet 14, covers 15, a table 16, a pivotable door 17, a side surface 18, an inclined surface 19, a protector 20, a chute 21, and a spindle 22. In the present embodiment, the direction of a major axis 23 of the spindle 22 shown in FIG. 2 is defined as the front-rear direction of the interior of the machine tool 1, the basal side of the spindle 22 is defined as the near side, and the distal side thereof is defined as the far side. In addition, a horizontal direction orthogonal to the spindle 22 is defined as the left-right direction, and a vertical direction orthogonal to the major axis 23 is defined as the up-down direction.

The pallet 14 is a platform on which a workpiece is placed and fixed. The machine tool 1 may be provided with a plurality of pallets 14. By doing so, a workpiece to be machined can be changed by changing the pallet 14, and it is thus possible to increase the time efficiency.

The covers 15 are components located on left and right sides of the pallet 14. The table 16 is movable in the front-rear direction, and thus can move the workpiece fixed on the pallet 14. In addition, at least a portion of the table is rotatable in the horizontal direction, and thus can rotate the workpiece fixed on the pallet.

The table 16 is a component to which the pallet 14 can be attached. The table 16 is movable in the front-rear direction, and thus can move the workpiece fixed on the pallet 14. In addition, at least a portion of the table 16 is rotatable in the horizontal direction, and thus can rotate the workpiece fixed on the pallet 14.

The pivotable door 17 is a door that is rotatable about an axis 25. When the pivotable door 17 rotates, the covers 15 cause the pallet 14 to be separated from the table 16, and the pivotable door 17 rotates together with the pallet 14 and the covers 15. Accordingly, the pallet 14 on which machining of the workpiece has finished can be carried out to a pallet storage, and a pallet 14 on which a workpiece to be machined next can be carried into the machine tool 1 from the pallet storage. The covers 15 may be provided on both the interior side of the machine tool 1 and the storage side of the pivotable door 17, and carrying out and carrying in of the pallet 14 may be simultaneously performed by the pivotable door 17 rotating 180°.

The side surface 18 is an openable and closable wall of the machine tool 1. The side surface 18 defines the interior and the exterior of the machine tool 1, and an operator can enter the interior of the machine tool 1 when the side surface 18 is opened. A side surface 18 (not shown) located at a position opposing the side surface 18 defines the interior of the machine tool 1 and a tool storage. A tool definer stores a plurality of tools. During machining, the side surface 18 is opened as needed, thus allowing a tool attached to the spindle 22 to be replaced with another tool stored in the tool storage.

The chute 21 is a location to which chips flow as a result of cleaning. The side surface 18 and the protector 20 are provided below the pivotable door 17 and the side surface 18, and are each inclined downward toward the chute 21 so as to facilitate the flow of chips.

The spindle 22 can machine a workpiece by being rotated about the major axis 23 thereof, with a tool attached to a distal end thereof. As shown in FIG. 2, the spindle 22 has a columnar outer shape in the present embodiment.

<Information Processing Device>

Figure 3:
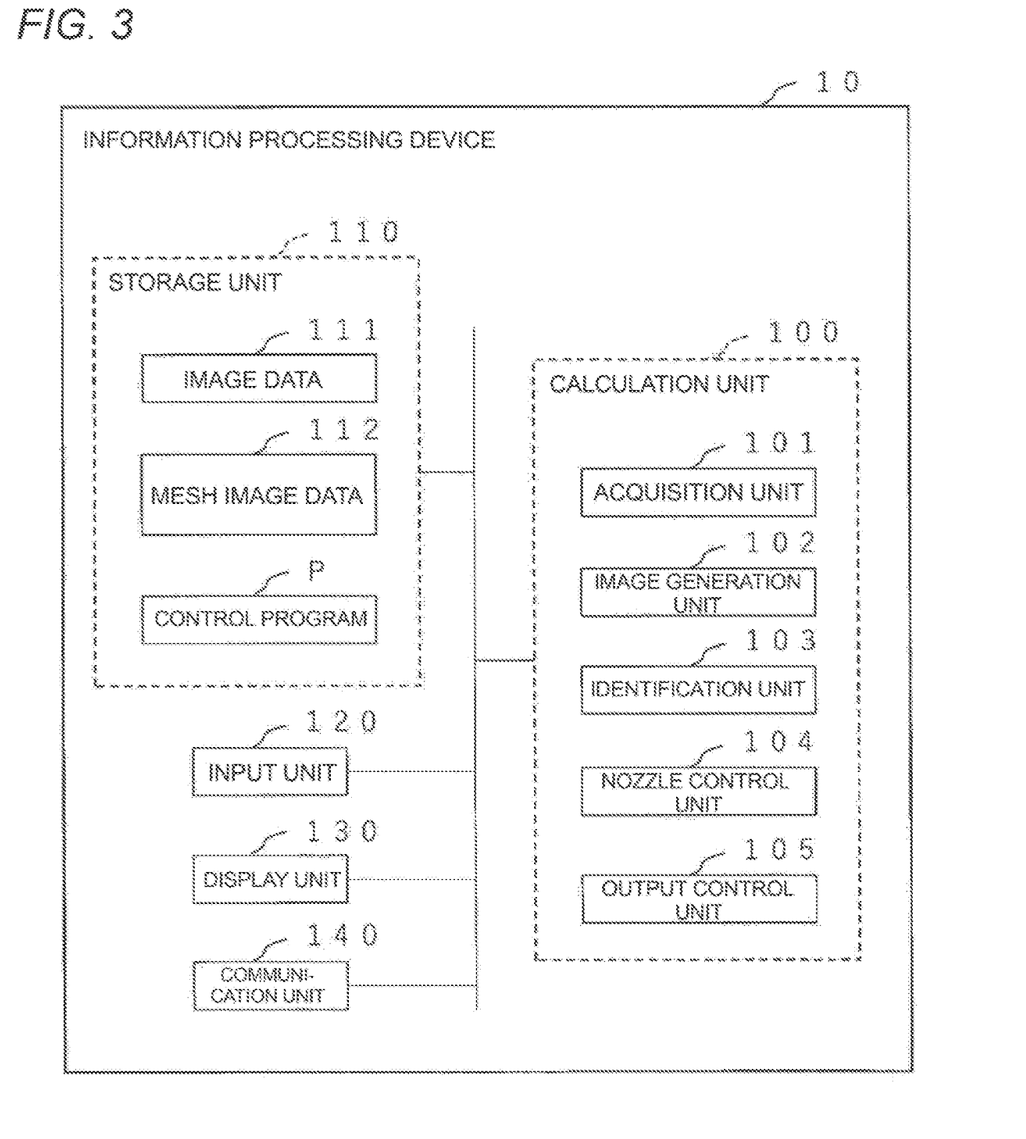
FIG. 3 is a block diagram showing a configuration of an information processing device.

An example of the information processing device 10 according to an embodiment will be described with reference to FIG. 3. The information processing device 10 detects a detection target from imaged data obtained by imaging the interior of the machine tool 1. Specifically, the information processing device 10 includes a calculation unit 100, a storage unit 110, an input unit 120, a display unit 130, and a communication unit 140. The information processing device 10 is an information processing device such as a computer or a tablet terminal, for example. The information processing device 10 may be included in the machine tool 1, or may be formed by a device separate from the machine tool 1, such as a personal computer. In the latter case, the information processing device 10 and the machine tool 1 are capable of performing wired or wireless communication. The information processing device 10 may have a configuration in which the input unit 120 and the display unit 130, for example, have been omitted from the information processing device 10 shown in FIG. 3. In this case, the input unit 120 and the display unit 130 may be included in the machine tool 1. For example, the input unit 120 and the display unit 130 may constitute a control board of the machine tool. Alternatively, the input unit 120 and the display unit 130 may be provided in each of the information processing device 10 and the machine tool 1, and the user can selectively use any of the input units 120 and any of the display units 130.

The calculation unit 100 is a controller responsible for overall control of the information processing device 10. For example, the calculation unit 100 executes the respective processing of an image generation unit 102, an identification unit 103, a nozzle control unit 104, and an output control unit 105 by reading out and executing a control program P stored in the storage unit 110. The calculation unit 100 is not limited to a calculation unit that realizes a predetermined function by hardware and software working cooperatively with each other, and may be a specifically designed hardware circuit that realizes a predetermined function. That is, the calculation unit 100 can be implemented by any of various processors such as a CPU, an MPU, a GPU, an FPGA, a DSP, and an ASIC.

The storage unit 110 is a recording medium that records various types of information. The storage unit 110 may be implemented, for example, by a RAM, a ROM, a flash memory, an SSD (Solid State Device), a hard disk, or a different storage device, or an appropriate combination thereof. In addition to the control program P executed by the calculation unit 100, various types of data or the like used in the machine tool 1 are stored in the storage unit 110. For example, the storage unit 110 stores image data 111 and mesh image data 112. Although an example in which the storage unit 110 stores the image data 111 and the mesh image data 112 is described here, the present disclosure is not limited thereto. Specifically, the storage device 6 shown in FIG. 1 may store the image data 111 and the mesh image data 112.

The input unit 120 is input means such as a keyboard, a mouse, and a touch panel used for inputting data and operation signals. The display unit 130 is output means such as a display used for outputting data.

The communication unit 140 is an interface circuit (module) for enabling data communication with an external device (not shown). For example, the communication unit 140 can perform data communication with the imaging unit 4 that images image data.

The acquisition unit 101 acquires the image data imaged by the imaging unit 4. The acquisition unit 101 causes the acquired image data 111 to be stored in the storage unit 110 together with arbitrarily added identification information and information for identifying the time of imaging. Accordingly, the storage unit 110 can store a plurality of pieces of image data 111 of the same target area that are imaged at different timings.

Figure 4:
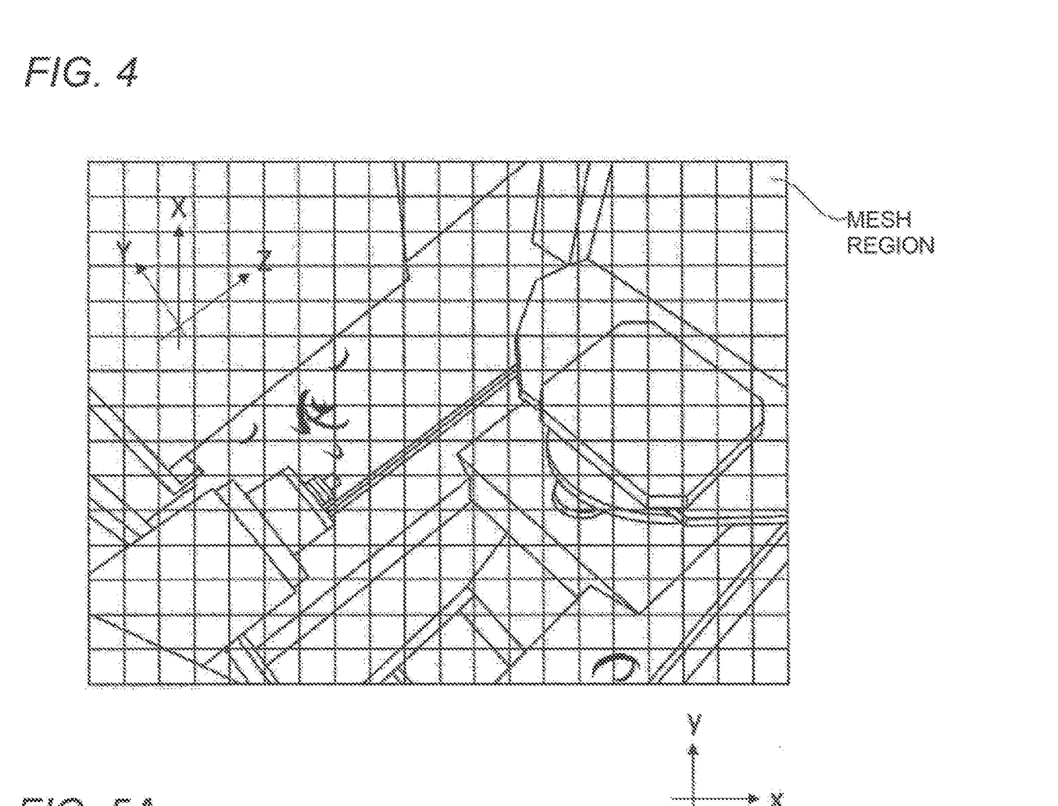
FIG. 4 shows mesh image data generated by the information processing device.

The image generation unit 102 generates mesh image data obtained by partitioning at least a portion of the image data into a plurality of mesh regions. In addition, the image generation unit 102 causes the mesh image data 112 obtained through division to be stored in the storage unit 110. Although FIG. 4 shows an example in which the entire image data 111 is divided into mesh regions, the present disclosure is not limited thereto. Specifically, the image generation unit 102 may set mesh regions only for a partial region of the image data 111. Note that the X axis, the Y axis, and the Z axis shown in the image data 111 of FIG. 4 respectively indicate coordinates of the machine tool 1, and the x axis and they axis outside the image data 111 indicate the xy coordinates of the image data. That is, the coordinate system of the machine tool and the coordinate system of the image data are different.

As will be described later, mesh image data 112 generated by the image generation unit 102 is referred to as "first mesh image data" as needed, in order to distinguish it from another image data that is divided using mesh regions and is used by the identification unit 103. In addition, each of the mesh regions of the first mesh image data is referred to as a "first mesh region". That is, a first mesh region may be any one of a plurality of first mesh regions present in the first mesh image data.

The size and the shape of meshes to be divided may be configured to be variable as needed. For example, it is conceivable that the size of each mesh region is defined according to the size of each chip as a detection target. This enables accurate detection of chips. Specifically, when the size of each chip as a detection target is 5 to 10 mm, setting each of the horizontal and vertical sizes of each mesh region to, for example, 20 mm, enables detection of chips and can maintain the detection accuracy.

The mesh image data 112 described herein is not limited to mesh image data obtained by adding mesh information to an imaged image to generate a new image, and may be mesh image data obtained by associating an imaged image and information relating to a mesh with each other. That is, an imaged image and a mesh that are saved as separate pieces of data are also referred to as mesh image data. The mesh image data may be generated, for example, by overlaying pre-saved mesh data with an imaged image.

Figure 5A:
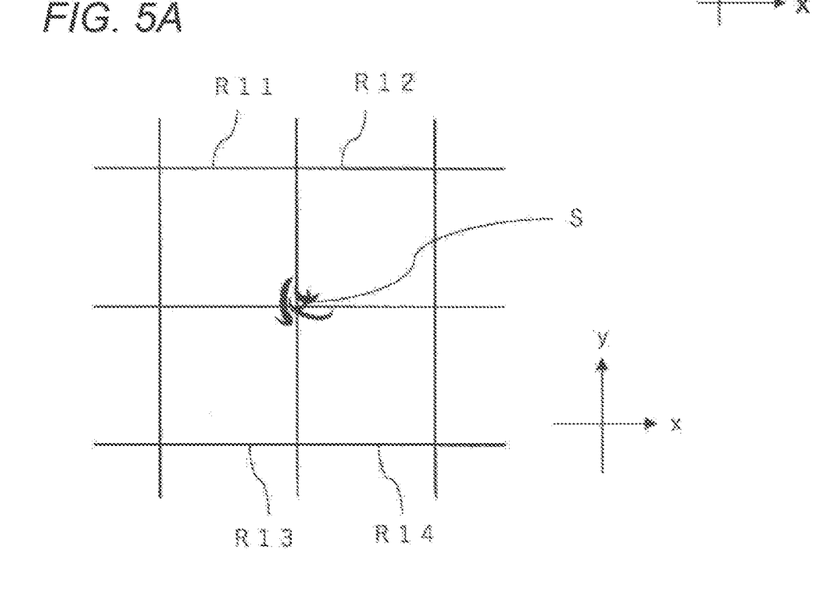
FIG. 5A is a diagram illustrating first mesh regions used by the information processing device.

The identification unit 103 uses each of the mesh regions of the mesh image data 112 as a first mesh region, and identifies the position of a detection target from each of the first mesh regions. FIG. 5A shows an example of a portion of the mesh image data 112, and mesh regions R11 to R14 are the first mesh regions. In the example shown in FIG. 5A, chips S as a detection target are present over a plurality of first mesh regions R11 to R14. Therefore, in a state as shown in FIG. 5A, the area of the chips S is small in each of the first mesh regions R11 to R14. For this reason, the identification unit 103 may determine that there is no or little chip S is present in each of the first mesh regions R11 to R14, and thus may not be able to identify the position of the detection target.

In order to identify the position of such a detection target, the identification unit 103 identifies the position of the detection target using the first mesh region, and a second mesh region shifted from the first mesh region by a predetermined amount and partially overlapping with the first mesh region. Specifically, even if the detection target is not included in a first mesh region, the identification unit 103 identifies the position of the first mesh region as a position at which the detection target is included, if the detection target is included in a second mesh region with which the first mesh region partially overlaps.

Figure 5B:
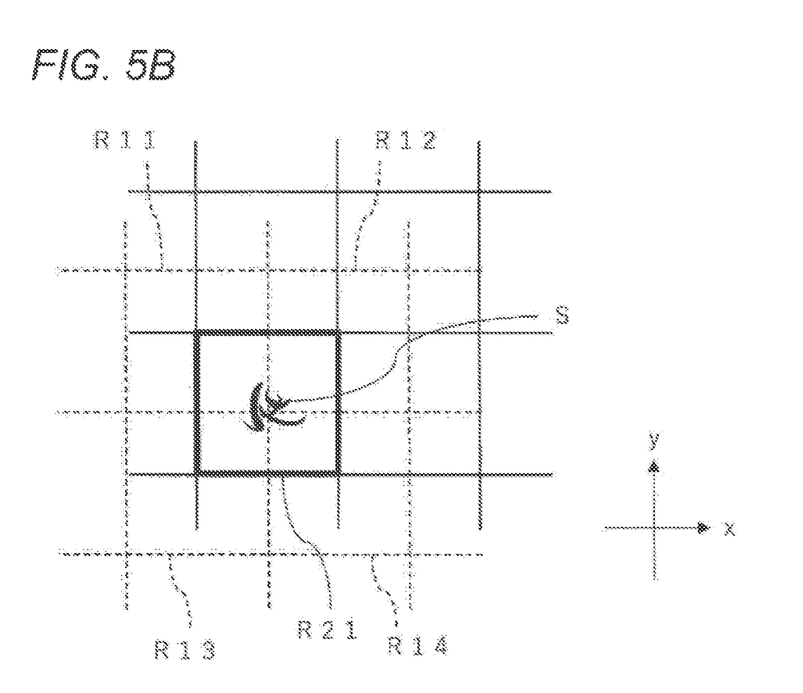
FIG. 5B is a diagram illustrating second mesh regions used by the information processing device.

This will be specifically described with reference to FIG. 5B. Each of the mesh regions indicated by the dashed line in FIG. 5B is the first mesh region described above with reference to FIG. 5A. Each of the mesh regions indicated by the solid line in FIG. 5B is a "second mesh region" that is set at a position sifted from the corresponding first mesh region. An image divided using the second mesh regions is referred to as "second mesh image data" in order to distinguish it from the first mesh image data. Note that the second mesh image data may be generated by the image generation unit 102, and be stored in the storage unit 110 together with the image data 111, or may be generated by the identification unit 103.

Specifically, each of the second mesh regions is moved relative to the corresponding first mesh region in at least either an x-axis direction that is a first direction or a y-axis direction that is a second direction on the image, and the first mesh region and the corresponding second mesh region are not coincident with each other. When the size of each mesh region is set to be 1 in each of the x direction and the y direction, FIG. 5B shows an example in which a mesh region that is moved from the corresponding first mesh region in the x direction by plus 0.5 and moved in the y direction by minus 0.5 is defined as the second mesh region. In the example shown in FIG. 5B, a second mesh region R21 partially overlaps with the first mesh regions R11 to R14. In addition, in the example shown in FIG. 5B, all of the chips S as the detection target are located in the second mesh region R21. Accordingly, the identification unit 103 can more easily identify the position of the detection target. In such a case, the identification unit 103 identifies, as the position of the chips S, for example, the first mesh regions R11 to R14 partially overlapping with the second mesh region R21 in which the chips S as the detection target have been detected. The identification unit 103 may identify that the chips S as the detection target are present in the second mesh region R21, or may identify that the chips S as the detection target are present in at least one of the first mesh regions R11 to R14 partially overlapping with the second mesh region R21.

That is, by shifting the mesh regions, the identification unit 103 uses a result of the first identification using the first mesh region, and a result of the second identification using the second mesh region, and thus can detect a detection target located at a position that cannot be detected by the first identification alone. In other words, the identification unit 103 moves each mesh region in at least either the x direction or the y direction, thus increasing the detection accuracy.

When it is necessary to discharge liquid to the position identified by the identification unit, the nozzle control unit 104 generates a signal for controlling the orientation of the nozzle such that the direction in which the liquid is discharged from the nozzle is directed to the position identified by the identification unit 103. Specifically, when the detection target is chips, the nozzle control unit 104 generates a signal for causing the numerical control device 2 to cause the liquid discharger 3 to transmit a control signal. In addition, the nozzle control unit 104 transmits the generated signal to the numerical control device 2, thus controlling the liquid discharger 3 via the numerical control device 2. Additionally, the nozzle control unit 104 may cause the storage unit 110 to store history of discharge of the liquid by the liquid discharger 3 as discharge history data. This allows the nozzle control unit 104 to adjust the orientation of the nozzle so as to be directed to the detected position, thus increasing the removal accuracy of chips. For example, the nozzle control unit 104 generates, after the position of the detection target has been identified in the first mesh region, a control signal for discharging the liquid toward the detection target whose position has been identified, and generates, after the position of the detection target has been identified in the second mesh region, a control signal for discharging the liquid toward the detection target whose position has been identified.

The output control unit 105 causes the display unit 130 to display a result of the determination performed by the identification unit 103. This allows the user to grasp the position of the detection target such as chips or a flaw.

If the identification unit 103 determines or identifies the amount of the detection target present, and a plurality of first mesh regions or second mesh regions in which the presence of the detection target has been identified are present, the nozzle control unit 104 may determine, based on the amount of the detection target present, the order of priority of positions to which the liquid is to be discharged from the liquid discharger, and may control the nozzle so as to discharge the liquid in descending order of priority. In this case, the nozzle control unit 104 generates a control signal according to the order of priority. As a result of the generated signal being transmitted to the numerical control device 2, the liquid discharger 3 is controlled, via the numerical control device 2, to be moved to the position to which the liquid is to be discharged according to the order of priority. In addition, the nozzle control unit 104 may, according to the amount of the detection target present, adjust the timing at which the control signal for discharging the liquid is output, or generate a control signal for adjusting the amount of the liquid to be discharged.

Note that the information processing device 10 may be incorporated in the machine tool 1. These processing operations may be implemented by a combination of a plurality of computers that are connected as an information processing system via a network. For example, all or part of the data stored in the storage unit 110 may be stored in an external recording medium connected via a network (not shown), and the information processing device 10 and the information processing system may be configured to use the data stored in the external recording medium.

<Processing for Identifying Position of Detection Target and Discharging Liquid>

Figure 6:
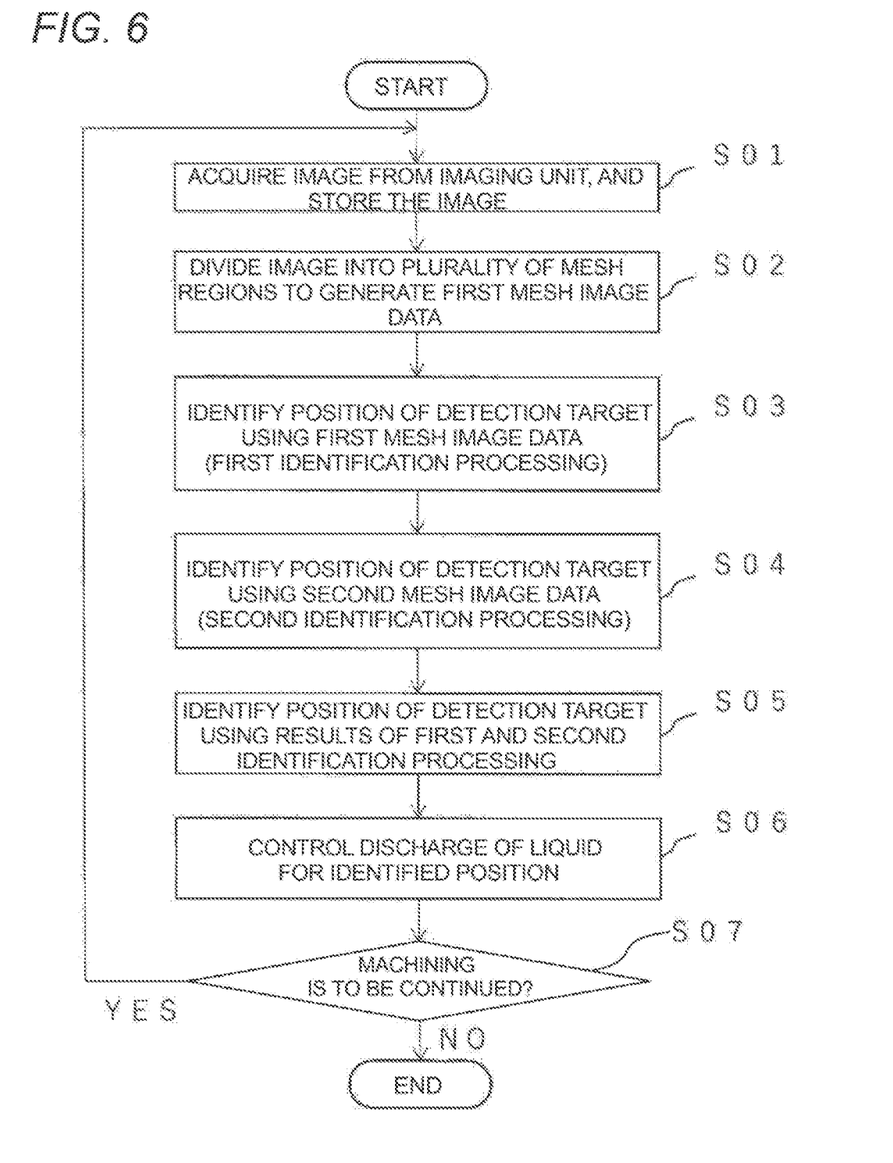
FIG. 6 is a flowchart illustrating processing for identifying the position of a detection target.

Processing for identifying the position of a detection target (or detecting the amount of a detection target present) and discharging liquid performed in the information processing device 10 according to an embodiment will be described with reference to the flowchart shown in FIG. 6. First, the acquisition unit 101 acquires image data 111 imaged by the imaging unit 4, and causes the image data 111 to be stored in the storage unit 110 (S01).

The image generation unit 102 reads out the image data 111 stored in the storage unit 110, and divides the image data 111 into a plurality of first mesh regions to generate mesh image data 112 serving as first mesh image data (S02). In addition, the image generation unit 102 causes the mesh image data 112 to be stored in the storage unit 110.

As first identification processing, the identification unit 103 identifies the position of a detection target using the first mesh image data (S03). Specifically, the identification unit 103 identifies the first mesh regions in which the detection target has been detected. Alternatively, in step S03, as first detection processing, the identification unit 103 may detect the presence probability or the like of the detection target for each of the first mesh regions of the first mesh image data.

As second identification processing, the identification unit 103 identifies the position of the detection target using second mesh image data (S04). Specifically, the identification unit 103 identifies the second mesh region in which the detection target has been detected. Alternatively, in step S04, as second detection processing, the identification unit 103 may detect the presence probability or the like of the detection target for each of the second mesh regions of the second mesh image data. As described above, the timing at which the second mesh image data used in step S04 is generated is not limited. For example, the second mesh image data may be generated by the image generation unit 102 concurrently with generation of the mesh image data 112 in step S02, or may be generated by the identification unit 103 at the timing of step S04.

Then, the identification unit 103 identifies the position of the detection target using a result of the first identification processing in step S03 and a result of the second identification processing in S04 in combination (S05). Specifically, in addition to the first mesh regions in which the detection target has been detected in step S03, the identification unit 103 identifies, as the position of the detection target, a first mesh region overlapping with the second mesh region in which the detection target has been detected in step S04. Alternatively, in step S05, for example, if the presence probability of the detection target is high in one of the second mesh regions, the identification unit 103 may identify that the detection target is present in that one of the second mesh regions. Alternatively, if the presence probability of the detection target is high in a second mesh region, the identification unit 103 may identify that the detection target is present in one of the first mesh regions that include an image region overlapping with that second mesh region. Alternatively, if the presence probability of the detection target is high in a second mesh region, the identification unit 103 may identify that the detection target is present in all of the first mesh regions that include an image area overlapping with that second mesh region.

The nozzle control unit 104 outputs a signal to the numerical control device 2, and outputs, to the liquid discharger 3, a control signal for moving the chips located at the position identified in step S05 via the numerical control device 2, thus controlling the discharging of the liquid (S06). Thus, the liquid discharger 3 discharges the liquid for moving the chips.

For example, in step S05, if no chip has been detected in any one of the first mesh regions, and any chip has been detected in one or more of the corresponding second mesh regions, coolant is discharged to the position corresponding to the first mesh region in step S06. Alternatively, in step S05, if no chip has been detected in any one of the first mesh regions, and any chip has been detected in one or more of the corresponding second mesh regions, coolant may be discharged to the position corresponding to that second mesh region in step S06. Alternatively, in step S05, if no chip has been detected in any one of the first mesh regions, and any chip has been detected in one or more of the corresponding second mesh regions, coolant may be discharged to the positions corresponding to a plurality of first mesh regions overlapping with that second mesh region in step S06.

Thereafter, if the machining in the machine tool 1 is to be ended (NO in S07), the processing ends. On the other hand, if the machining in the machine tool 1 is to be continued (YES in S07), the information processing device 10 returns to the processing of step S01, and repeats the processing operations of steps S01 to S07.

In the example described with reference to the flowchart shown in FIG. 6, the detection target is chips, and the liquid is discharged in response to detection of the chip. However, the information processing device 10 may output the position of the detection target using the output control unit 105.

As such, with the machine tool 1 and the information processing device 10 according to the embodiments, it is possible to detect or identify the position, the amount present, or the presence probability or the like of a detection target such as chips using a plurality of combinations of mesh regions. Accordingly, it is possible to prevent detection omission depending on the positional relationship between mesh regions and chips, thus accurately identifying the position of chips.

[Modification 1]

The information processing device 10 described above uses results of the first and second identification processing. However, the method for identifying the position of the target by the information processing device 10 is not limited to a method that uses results of the first and second identification processing, and may be a method that uses a result of only one of the first and second identification processing. For example, the identification unit 103 may be configured to: (1) identify a position corresponding to a predetermined mesh region as the position of the target using a first mesh region; (2) identify, if the position of the target has not been identified using the first mesh region, a predetermined second mesh region as the position of the target using the second mesh region that is shifted from the first mesh region by a predetermined amount and that partially overlaps with the first mesh region; and (3) identify, if the position has not been identified using the first mesh region or the second mesh region alone, the position of the target using results obtained for the first mesh region and the second mesh region.

Figure 7:
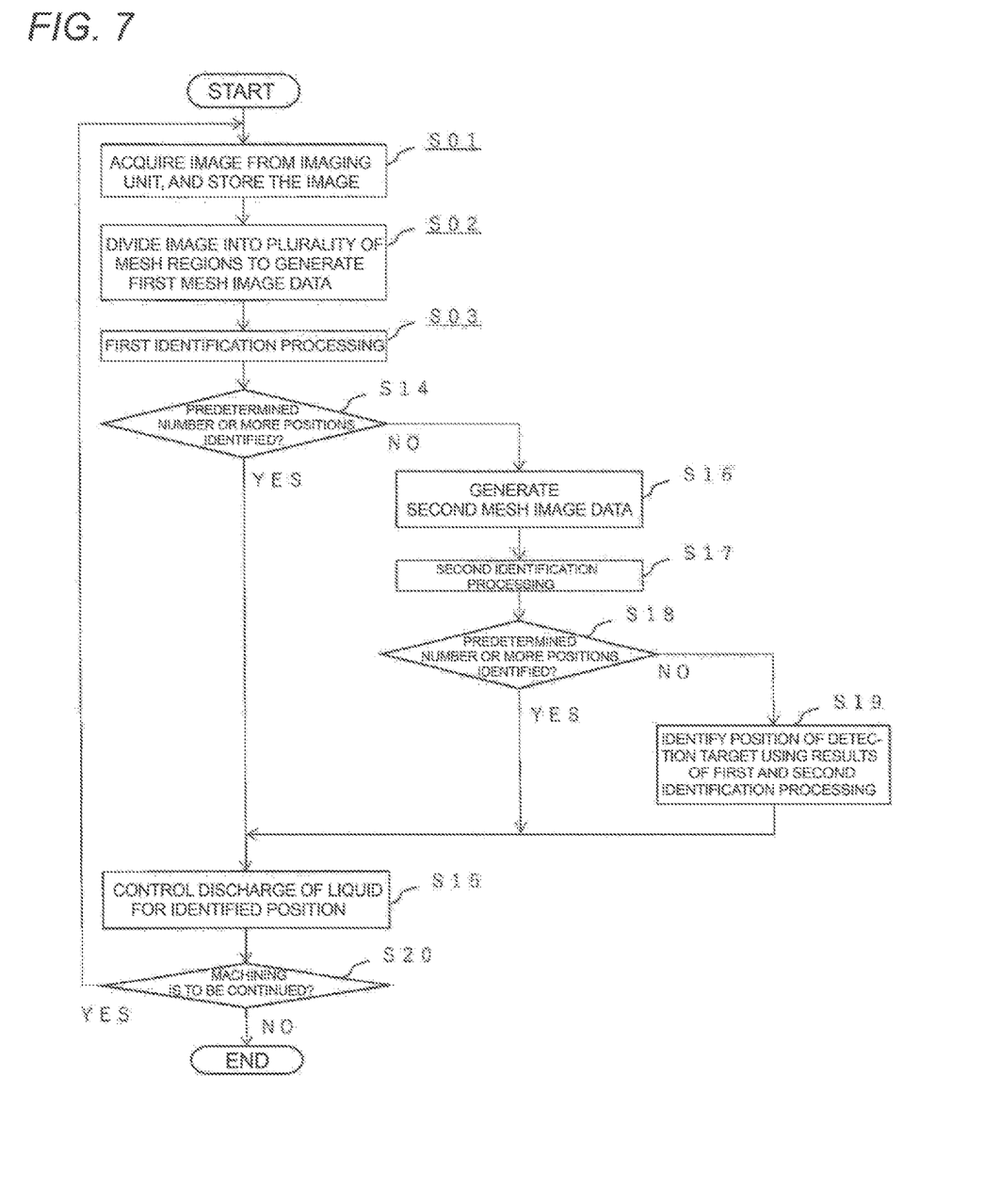
FIG. 7 is a flowchart illustrating processing for identifying the position of a detection target according to Modification 1.

Processing for identifying the position of a detection target and discharging liquid performed by an information processing device 10 according to Modification 1 will be described with reference to FIG. 7. Note that the configuration of the information processing device 10 is the same as the configuration described above with reference to FIG. 3. Accordingly, reference will be made to FIG. 3. In the flowchart of FIG. 7, processing steps that are the same as the processing steps in the flowchart of FIG. 6 are underlined and denoted by the same reference numerals.

First, the acquisition unit 101 acquires image data 111 imaged by the imaging unit 4, and causes the image data 111 to be stored in the storage unit 110 (S01).

The image generation unit 102 reads out the image data 111 stored in the storage unit 110, and divides the image data 111 into a plurality of first mesh regions to generate mesh image data 112 serving as first mesh image data (S02).

As first identification processing, the identification unit 103 identify the position of a detection target using the first mesh image data (S03). Alternatively, in step S03, as first detection processing, the identification unit 103 may detect the presence probability or the like of the detection target for each of the first mesh regions of the first mesh image data.

Then, the identification unit 103 determines whether or not the position of the detection target has been identified from the first mesh image data in a mesh region greater than or equal to a predetermined mesh region (e.g., a mesh region greater than or equal to 50% of all the mesh regions in the first mesh image data) (S14).

If the position of the detection target has been identified from the first mesh image data in a mesh region greater than or equal to the predetermined mesh region (YES in S14), the nozzle control unit 104 outputs a signal to the numerical control device 2, and outputs, to the liquid discharger 3, a control signal for moving the chips located at the position identified in step S14 via the numerical control device 2, thus controlling the discharging of the liquid (S15).

On the other hand, if the position of the detection target has not been identified from the first mesh image data in a mesh region greater than or equal to the predetermined mesh region (NO in S14), the identification unit 103 generates second mesh image data obtained by shifting the first mesh image data (S16).

As second identification processing, the identification unit 103 identifies the position of the detection target using the second mesh image data (S17). Alternatively, in step S17, as second detection processing, the identification unit 103 may detect the presence probability or the like of the detection target for each of the second mesh regions of the second mesh image data.

Then, the identification unit 103 determines whether or not the position of the detection target has been identified from the second mesh image data in a mesh region greater than or equal to a predetermined mesh region (e.g., a mesh region greater than or equal to 50% of all the mesh regions in the second mesh image data) (S18).

If the position of the detection target has not been detected from the second mesh image data in a mesh region greater than or equal to the predetermined mesh region (NO in S18), the identification unit 103 identifies the position of the detection target using the first mesh image data and the second mesh image data (S19).

If the position of the detection target has been identified from the second mesh image data in a mesh region greater than or equal to the predetermined mesh region (YES in S18), or if the position of the detection target has been identified using the first mesh image data and the second mesh image data (S19), the nozzle control unit 104 outputs a signal to the numerical control device 2, and outputs, to the liquid discharger 3, a control signal for moving the chips located at the position identified in step S18 or S19 via the numerical control device 2, thus controlling the discharging of the liquid (S15). At this time, for example, if the presence probability of the detection target is high in one of the second mesh regions, the identification unit 103 may identify that the detection target is present in that one of the second mesh regions. Alternatively, if the presence probability of the detection target is high in a second mesh region, the identification unit 103 may identify that the detection target is present in one of the first mesh regions that have an image region overlapping with that second mesh region. Alternatively, if the presence probability of the detection target in high in a second mesh region, the identification unit 103 may identify that the detection target is present in all of the first mesh regions that have an image region overlapping with that second mesh region.

Thereafter, if the machining in the machine tool 1 is to be ended (NO in S20), the processing ends. On the other hand, if the machining in the machine tool 1 is to be continued (YES in S07), the information processing device 10 returns to the processing of step S01, and repeats the processing operations of steps S01 to S20.

In the description thus far, if the position of the detection target has not been identified in a number of mesh regions greater than or equal to a predetermined number in step S14 of FIG. 7, the information processing device 10 generates the second mesh image data without using the information of the mesh regions in which the position of the detection target has been identified, and performs the second identification processing for identifying the position of the detection target in all the mesh regions. However, the processing need not be executed according to such a flow. For example, the information of the mesh regions in which the position of the detection target has been identified in step S14 may be used. Specifically, in step S14, if the position of the detection target has been identified in the predetermined mesh region in the first mesh image data (YES in S14), the information processing device 10 performs control to discharge liquid to the mesh regions in which the identified detection target is present (S15). Although the processing that follows is not shown, first, the information processing device 10 moves the detection target. The information processing device 10 stores information of the mesh regions in which the position of the detection target has not been identified in step S14, then generates second mesh image data, and performs second identification processing for mesh regions corresponding to the mesh regions in which the position of the target position has not been identified in step S14. Through the second identification processing, for the mesh regions in which the position of the detection target has been identified, the information processing device 10 performs control for discharging liquid to the mesh regions in which the identified detection target is present. In this case, the NO branch of step S18 need not be provided. As a result of executing such a flow, the information processing device 10 detects the position of the detection target using two pieces of mesh image data, and therefore the detection accuracy of the position of the detection target is higher than that in the case where one mesh image data is used. In addition, there is no need to comparatively analyze two pieces of mesh image data, and the amount of processing for image analysis is reduced. Accordingly, it is possible to discharge the liquid in a short time.

[Modification 2]

The identification unit 103 may identify the position of the detection target using a trained learning model. Specifically, the identification unit 103 utilizes a trained model obtained by machine learning a relationship between a plurality of pieces of learning image data including a detection target, a plurality of mesh regions respectively set for the pieces of learning image data, and the presence or absence of the detection target in the mesh images, and uses, as detection image data, image data that is acquired by the acquisition unit 101, thereby identifying a region including the detection target from detection image data. By using the learning model, it is possible to increase the detection accuracy.

The trained model may be obtained by machine learning the amount of the detection target together with the leaning image data, the mesh regions, and the presence or absence of the detection target, and the identification unit 103 may identify the amount of the detection target together with the presence or absence of the detection target. In this case, according to the identified amount of the detection target, the nozzle control unit 104 can adjust the timing at which the control signal for discharging the liquid is output, or generate a control signal for adjusting the amount to be discharged. This can increase the accuracy of chip removal.

In the foregoing, the embodiments have been described as examples of the technique disclosed in the present application. However, the technique according to the present disclosure is not limited thereto, and is also applicable to embodiments to which alteration, replacement, addition, omission, and so forth have been made as appropriate.

The information processing device, the machine tool, and the information processing system according to all claims of the present disclosure are each realized by cooperation with hardware resources, for example, a processor, a memory, and a program.

INDUSTRIAL APPLICABILITY

The information processing device, the machine tool, and the information processing system according to the present disclosure are each useful for identifying the position of a detection target in a machine tool, for example.

REFERENCE SIGNS LIST

1 . . . . Machine tool
10 . . . . Information processing device
100 . . . . Calculation unit
101 . . . . Acquisition unit
102 . . . . Image generation unit
103 . . . . Identification unit
104 . . . . Nozzle control unit
105 . . . . Output control unit

The invention claimed is:

1. An information processing device configured to identify presence of a detection target from image data imaged by an imaging unit configured to image an interior of a machine tool including the imaging unit, the information processing device comprising:
a processor with a memory, the processor configured to perform tasks of:
an image generation unit configured to generate a mesh image obtained by partitioning at least a portion of the image data into a plurality of first mesh regions and a plurality of second mesh regions; and
an identification unit configured to perform a first identification of the presence of the detection target from each of the first mesh regions of the mesh image,
wherein the identification unit is further configured to, even if the presence of the detection target has not been identified from the first mesh regions in the first identification, perform a second identification of the presence of the detection target from the plurality of second mesh regions, the second mesh regions each having the same size as the first mesh regions, being shifted from the plurality of first mesh regions by a predetermined amount, and partially overlapping with the first mesh regions.

2. The information processing device according to claim 1, wherein the processor is further configured to perform the tasks of:
a control unit configured to generate a control signal for discharging liquid to a position of the detection target,
wherein the control unit is configured to: after the position has been identified in the first mesh region, generate a control signal for discharging the liquid toward the detection target whose position has been identified; and, after the position has been identified in the second mesh region, generate a control signal for discharging the liquid toward the detection target whose position has been detected.

3. The information processing device according to claim 1, wherein the second mesh region is moved relative to the first mesh region in at least either a first direction or a second direction orthogonal to the first direction, and the first mesh region and the second mesh region are not coincident with each other.

4. The information processing device according to claim 1, wherein the detection target is chips that have been produced from a workpiece to be machined by the machine tool and been accumulated inside the machine tool, or a flaw formed in the workpiece as a result of machining.

5. The information processing device according to claim 1, wherein a nozzle for discharging liquid is installed inside the machine tool, and
wherein the processor is further configured to perform the tasks of:
control unit configured to control an orientation of the nozzle such that a direction in which the liquid is discharged from the nozzle is directed to a position identified by the identification unit.

6. The information processing device according to claim 1, wherein the identification unit is configured to: utilize a trained model obtained by machine learning a relationship between a plurality of pieces of learning image data including a detection target, region information of a plurality of mesh images respectively set for the pieces of learning image data, and the presence or absence of the detection target in the mesh images; and use, as detection image data, image data that is input, thereby identifying a region including the detection target from the detection image data.

7. An information processing method comprising:
an imaging step of imaging an interior of a machine tool;
an image generation step of generating a mesh image obtained by partitioning at least a portion of imaged image data into a plurality of first mesh regions and a plurality of second mesh regions;
a first identification step of identifying presence of a detection target from each of the first mesh regions of the mesh image; and
even if the presence of the detection target has not been identified from the first mesh regions in the first identification step, a second identification step of identifying the presence of the detection target from each of the second mesh regions, the second mesh regions each having the same size as the first mesh regions, being shifted from the plurality of first mesh regions by a predetermined amount, and partially overlapping with the first mesh regions.

8. A machine tool system comprising:
a machine tool having an interior and comprising a spindle in the interior rotatable about a major axis such that the spindle is configured for machining a workpiece in the interior, whereby chips from the workpiece are produced in the interior;
a liquid discharger configured for discharging liquid for moving the chips produced as a result of machining by the spindle;

an imaging unit for imaging the interior of the machine tool; and an information processing device configured to identify a presence of a detection target from image data from the imaging unit, the information processing device comprising a processor with a memory, the processor configured to perform tasks of:

an image generation unit configured to generate a mesh image by partitioning at least a portion of the image data into a plurality of first mesh regions and a plurality of second mesh regions; and an identification unit configured to perform a first identification of the presence of the detection target from each of the first mesh regions of the mesh image, wherein the identification unit is further configured to, even if the presence of the detection target has not been identified from the first mesh regions in the first identification, perform a second identification of the presence of the detection target from the plurality of second mesh regions, the second mesh regions each having the same size as the first mesh regions, being shifted from the plurality of first mesh regions by a predetermined amount, and partially overlapping with the first mesh regions.

* * * * *